(12) United States Patent
Armschat et al.

(10) Patent No.: US 8,994,232 B2
(45) Date of Patent: Mar. 31, 2015

(54) STAR-POINT REACTOR

(75) Inventors: Christoph Armschat, Erlangen (DE);
Mike Dommaschk, Moehrendorf (DE);
Volker Hussennether, Nuremberg (DE);
Thomas Westerweller, Grossenseebach (DE)

(73) Assignee: Siemens Aktiengesellschaft, Munich (DE)

( * ) Notice: Subject to any disclaimer, the term of this patent is extended or adjusted under 35 U.S.C. 154(b) by 531 days.

(21) Appl. No.: 13/384,373

(22) PCT Filed: Jul. 6, 2010

(86) PCT No.: PCT/EP2010/059632
§ 371 (c)(1),
(2), (4) Date: Jan. 17, 2012

(87) PCT Pub. No.: WO2011/006796
PCT Pub. Date: Jan. 20, 2011

(65) Prior Publication Data
US 2012/0120691 A1    May 17, 2012

(30) Foreign Application Priority Data
Jul. 17, 2009  (DE) .......................... 10 2009 034 354

(51) Int. Cl.
*G06F 3/06*    (2006.01)
*H02J 3/36*    (2006.01)
(Continued)

(52) U.S. Cl.
CPC .. *H02J 3/36* (2013.01); *H02M 7/49* (2013.01); *H02M 2007/4835* (2013.01); *Y02E 60/60* (2013.01)
USPC .......................................................... 307/151

(58) Field of Classification Search
USPC .......................................................... 307/151
See application file for complete search history.

(56) References Cited

U.S. PATENT DOCUMENTS

| 6,885,273 B2 | 4/2005 | Min et al. |
| 7,881,078 B2 | 2/2011 | Pereira et al. |

(Continued)

FOREIGN PATENT DOCUMENTS

| AT | 114765 B | 10/1929 |
| CN | 101247040 A | 8/2008 |

(Continued)

OTHER PUBLICATIONS

Dorn et al, "A new Multilevel Voltage-Sourced Converter Topology for HVDC Applications", CIGRE 2008, Paris, B4-304, http://cigre.org.

(Continued)

*Primary Examiner* — Robert L. Deberadinis
(74) *Attorney, Agent, or Firm* — Laurence A. Greenberg; Werner H. Stemer; Ralph E. Locher

(57) ABSTRACT

A device for inverting an electric parameter in the field of power transmission and distribution has a converter that can be connected between an alternating current grid and a DC circuit and having power semiconductor valves extending between an alternating current connection and a DC voltage connection. Each power semiconductor valve has a series circuit of bipolar submodules, each with an energy storage device and a power semiconductor circuit in parallel with the energy storage device, and a grid connection unit connected to the alternating current connection for connecting to the alternating current grid. Simple, effective, and inexpensive symmetrization of the voltages in the DC voltage circuit relative to ground potential is brought about. A star point reactor is connected between the grid connection unit and the inverter with a potential node, including throttle coils connected to a grounded star point. The throttle coils are implemented so that said coils implement a current path with a high impedance to ground potential for alternating current at the base frequency of the alternating current grid, and with low impedance to ground potential for DC current.

11 Claims, 1 Drawing Sheet

(51) Int. Cl.
*H02M 7/49* (2007.01)
*H02M 7/483* (2007.01)

(56) References Cited

U.S. PATENT DOCUMENTS

| | | |
|---|---|---|
| 7,960,871 B2 | 6/2011 | Dommaschk et al. |
| 8,400,796 B2 | 3/2013 | DöfnäS et al. |
| 2007/0279947 A1 | 12/2007 | Brandt et al. |
| 2008/0232145 A1 | 9/2008 | Hiller et al. |
| 2008/0252142 A1 | 10/2008 | Davies et al. |
| 2009/0080225 A1 | 3/2009 | Dijkhuizen |
| 2010/0008111 A1 | 1/2010 | Petersson et al. |
| 2012/0120691 A1 | 5/2012 | Armschat et al. |

FOREIGN PATENT DOCUMENTS

| | | |
|---|---|---|
| DE | 2036762 A1 | 2/1972 |
| DE | 19882837 T1 | 3/2001 |
| DE | 10103031 A1 | 7/2002 |
| DE | 102005012371 A1 | 9/2006 |
| DE | 102005040543 A1 | 3/2007 |
| EP | 0829948 A2 | 3/1998 |
| EP | 2454794 B1 | 6/2013 |
| GB | 2331854 A | 6/1999 |
| RU | 2381606 C2 | 2/2010 |
| WO | 9928924 A1 | 6/1999 |
| WO | 02/063758 A1 | 8/2002 |
| WO | 2005/067118 A1 | 7/2005 |
| WO | 2007028350 A1 | 3/2007 |
| WO | 2007075132 A1 | 7/2007 |
| WO | 2008/024038 A1 | 2/2008 |
| WO | 2008/036009 A1 | 3/2008 |
| WO | 2008067784 A1 | 6/2008 |
| WO | 2009086927 A1 | 7/2009 |

OTHER PUBLICATIONS

CIGRE Brochure 269, "VSC Transmission" Working Group B4.37, Chapter 3, 2005.

Hill E. P.; "Rotary Converters", Chapman and Hall, Ltd, pp. 128; 1927.

Franklin A.C. et al.; "The J&P Transformer Book", 11th Edition, Butterworths, London, 1983.

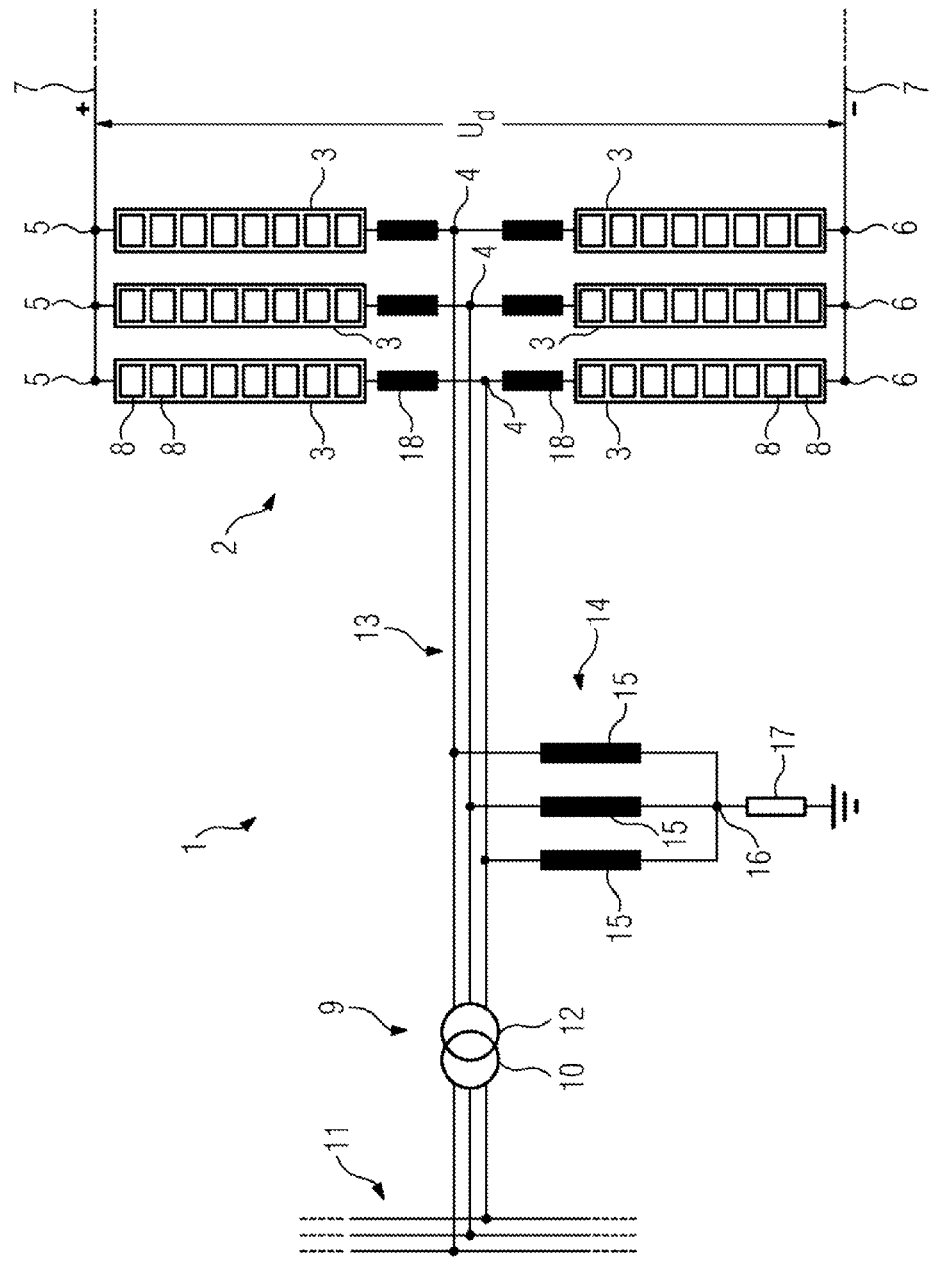

STAR-POINT REACTOR

BACKGROUND OF THE INVENTION

Field of the Invention

The invention relates to an apparatus for converting an electrical variable in the sector of electrical energy transmission and distribution with a converter, which can be switched between an AC voltage system and a DC voltage circuit and has power semiconductor valves, which extend between an AC voltage connection and a DC voltage connection, each power semiconductor valve comprising a series circuit comprising bipolar submodules, which each have an energy store and a power semiconductor circuit, and a system connection unit for connection to the AC voltage system, said system connection unit being connected to the AC voltage connection.

Apparatuses for converting an electrical variable are known, for example, as part of a high-voltage direct-current transmission system. A high-voltage direct-current transmission system (HVDC system) generally has two converters which are connected to one another via a DC voltage intermediate circuit and which are coupled on the AC-voltage side to in each case one AC voltage system. It is possible with the aid of the high-voltage direct-current transmission system to transmit electrical power from one AC voltage system to the other AC voltage system. In particular, power transmission over long distances is advantageous with high-voltage direct-current transmission since lower losses occur during transmission in comparison with transmission with AC voltage.

Different converter topologies for the HVDC transmission are known from the prior art. Two-stage converters, which are referred to as two-point converters by those skilled in the art, generate only two different voltage levels at their output. The converter valves of the two-point converters have a large number of power semiconductor switches, which are arranged in series with one another. The series-connected power semiconductors all need to be switched at the same time, i.e. from an interrupter position, in which a current flow via the power semiconductor is interrupted, into a conducting position, in which a current flow via the power semiconductor is enabled. Self-commutated and voltage-impressing converters are also referred to as "voltage source converters (VSCs)". Converters having three voltage stages are referred to as three-point converters.

In addition to two-point and three-point converters, the prior art has also disclosed so-called multi-stage converters, which are also referred to as "multilevel voltage source converters (VSCs)" by those skilled in the art. Multilevel VSCs generally have power semiconductor valves consisting of bipolar submodules, which each have an energy store, such as a capacitor, for example, and a power semiconductor circuit, with the aid of which it is possible to generate the voltage drop across the capacitor or else a zero voltage at the output terminals of each submodule. Owing to the series circuit comprising the submodules, the voltage at the output of each power semiconductor valve can be varied in stepwise fashion, with the level of these stages being determined by the voltage drop across the respective capacitor. The central capacitor, provided in the case of two-point or three-point converters, of the DC voltage circuit is distributed among the individual submodules of the power semiconductor valves in the case of multilevel VSCs. Multilevel converters have the disadvantage that the poles of the DC voltage intermediate circuit to which the power semiconductor valves of the converter are connected can have voltages with different magnitudes with respect to the ground potential.

BRIEF SUMMARY OF THE INVENTION

The object of the invention is therefore to provide a converter of the type mentioned at the outset which can be used to bring about simple, effective and inexpensive balancing of the voltages in the DC voltage circuit with respect to the ground potential.

The invention achieves this object by a star-point reactor, which is connected to a potential point between the system connection unit and the converter and has inductor coils which are interconnected to form a grounded star point, the inductor coils being configured in such a way that they represent a current path with a high impedance to ground potential, for alternating current with the fundamental frequency of the AC voltage system, and a current path with a low impedance to ground potential, for a direct current.

According to the invention, the converter-side potential coupling is realized by a star-point reactor. The star-point reactor has inductor coils, which are interconnected to form a star point and which, on their side facing away from the star point, are DC-connected to an AC voltage connection of the respective converter. In other words, when the apparatus according to the invention is connected to an AC voltage system with the aid of the system connection unit, the star-point reactor is arranged in parallel with the AC voltage system. The inductor coils of the star-point reactor are configured in such a way that they represent a current path with a high impedance for the fundamental component of the alternating current, which is generally 50 or 60 Hz, with the result that the alternating currents cannot flow away via the grounded star point. However the current flow of direct currents is possible with an order of magnitude of parasitic leakage currents on insulator surfaces. Expediently, the star-point reactor is located, when installed outdoors, in the vicinity of a valve hall, in which the power semiconductor valves are arranged. It is therefore possible with the aid of this star-point reactor to balance the DC voltage intermediate circuit of multilevel converters having a floating potential. In other words, the poles of the DC voltage intermediate circuit have voltages with approximately equal values in comparison with the ground potential.

Expediently, the star point of the star-point reactor is connected to the ground potential via a nonreactive resistor. With the aid of the nonreactive resistor, it is possible for resonances or oscillations to be avoided between the conductor-to-ground capacitance of the DC voltage intermediate circuit and the inductance of the star-point reactor. In this way, attenuation is thus provided.

Expediently, each inductor coil has a magnetizable core. The magnetizable core may be an iron core or the like, for example. In accordance with an expedient development in this regard, the core delimits an air gap. The air gap serves the purpose of avoiding premature saturation of the core when conducting direct currents of up to 100 mA, for example.

Expediently, each submodule has a full-bridge circuit with four disconnectable power semiconductors, which are interconnected with the energy store in such a way that an energy store voltage drop across the energy store, a zero voltage or else the inverse energy store voltage can be generated at the output terminals of the submodule. Such full-bridge circuits are best known to a person skilled in the art in this field, with the result that no further details need to be given here as regards precise mode of operation and circuitry thereof. Full-bridge circuits are also referred to as H-bridge circuits. A freewheeling diode is connected in parallel, in opposition, with each disconnectable power semiconductor.

As a deviation from this, each submodule has a half-bridge circuit with two disconnectable power semiconductors, which are interconnected with the energy store in such a way that an energy store voltage drop across the energy store or a zero voltage can be generated at output terminals of the submodule. Converters with such a topology and the submodules are also referred to as so-called "Marquardt converters". In contrast to the full-bridge circuit, it is not possible for an inverse energy store voltage to be generated at the output terminals with the half-bridge circuit. For that reason, the number of cost-intensive power semiconductors for the converter is reduced to half in the case of the half-bridge circuit. In this case, too, a freewheeling diode is again connected in parallel, in opposition, with each drivable and disconnectable power semiconductor, such as IGBT or GTO.

Advantageously, the system connection unit is a transformer. The transformer is wired corresponding to the respective requirements. The primary winding of the transformer is connected to the AC voltage system via a switchgear assembly, for example. The secondary winding of the transformer is DC-connected to the AC voltage connection of the converter and to the star-point reactor. An inductor coil is provided for each phase which extends from the system connection unit up to the AC voltage connection of the converter. In the context of the invention, therefore, the number of inductor coils corresponds to the number of phases in the connectable AC voltage system.

In a further variant, the system connection unit comprises an inductance, which can be connected in series with the AC voltage system. The current path from the AC voltage system to the AC voltage connection of the converter passes via the inductance, which is connected in series, in accordance with this development. The system connection unit can furthermore have a capacitor, which is connected in series with inductance. Furthermore, it is possible for the system connection unit to have both a transformer and a series-connected inductance and a series-connected capacitor. The inductance is in principle any desired inductive component. Expediently, the inductance is a coil, an inductor, a winding or the like.

Expediently, the inductor coils of the star-point reactor are fitted on insulators. In particular, it is expedient for the star-point reactor with its inductor coils to be installed outdoors.

Advantageously, the converter has a non-grounded converter star point, with the inductor coils being arranged at the converter star point.

Further expedient configurations and advantages of the invention are the subject matter of the following description relating to exemplary embodiments with reference to the FIGURE in the drawing, in which

BRIEF DESCRIPTION OF THE DRAWING

FIGURE shows an exemplary embodiment of a star-point reactor of an apparatus according to the invention.

DESCRIPTION OF THE INVENTION

FIG. 1 shows an exemplary embodiment of the apparatus 1 according to the invention, which has a converter 2 with six power semiconductor valves 3, which each extend between an AC voltage connection 4 and a DC voltage connection 5 or 6. In this case, an inductance 18 in the form of a coil is provided between each power semiconductor valve 3 and each AC voltage connection 4, said inductance facilitating in particular the regulation of circulating currents, which can flow between different power semiconductor valves 3. Each DC voltage connection 5 is connected to the positive terminal of a DC voltage intermediate circuit 7, which is only illustrated partially in the FIGURE. The DC voltage connections 6 are connected to the negative terminal (−) of the DC voltage intermediate circuit 7. Each power semiconductor valve 3 comprises a series circuit comprising bipolar submodules 4, which each have a capacitor (not illustrated in the figures) and a power semiconductor circuit comprising two disconnectable power semiconductors, IGBTs, with which in each case one freewheeling diode is connected in parallel, in opposition. The submodules 8 are bipolar and therefore have two output terminals. The circuitry for the power semiconductors and the capacitor is selected such that either the capacitor voltage drop across the capacitor or else a zero voltage can be generated at the output terminals of each submodule. By expedient driving of the submodules 8 it is therefore possible to adjust the voltage drop across the power semiconductor valves 3 in stepwise fashion. The number of submodules is between 20 and several hundred in applications in the sector of high-voltage direct-current transmission.

In addition, the apparatus 1 has a transformer 9 as system connection unit, with the transformer 9 having a primary winding 10, which is connected to an AC voltage system 11, and a secondary winding 11, which is DC-connected to the AC voltage connections 4 of the converter 1. The AC voltage system 11 has a three-phase configuration. This applies correspondingly to the number of AC voltage connections 4 and to a conductor section 13 for DC-connection of the secondary winding 12 to the AC voltage connections 4. The conductor section 13 can also be referred to as a potential point between the system connection unit 9 and the AC voltage connections 4 of the converter 2.

In order to balance the positive DC voltage and the negative DC voltage, i.e. in other words to balance the terminals of the DC voltage intermediate circuit 7 with respect to the ground potential, a star-point reactor 14 is provided. The star-point reactor 14 has three inductor coils 15, which are interconnected to form a star point 16. The star point 16 is connected to the ground potential via a nonreactive resistor 17. Each inductor coil 15 is connected on its side facing away from the star point 16 to a phase of the conductor section 13 and is therefore DC-connected to an AC voltage connection 4 of the converter 2.

The inductor coils 15 are configured in such a way that they represent a current path with a high impedance for the fundamental frequency of the AC voltage of the AC voltage system 11, which is 50 Hz in the selected exemplary embodiment. In addition, each inductor coil 15 has an iron core. In order to avoid premature saturation of the iron core, an air gap is provided within each iron core of the inductor coils 15. The star-point reactor is constructed as a discharge voltage transformer, which is conventional on the market, with the secondary windings of the discharge voltage transformer being omitted. The inductor coils 15 of the star-point reactor are installed on expedient insulators, for example insulators which are designed for 39 kV. A potential coupling of the converter 2 on the AC-voltage side is thus made possible with the aid of the star-point reactor 14, with balancing of the terminals of the DC voltage intermediate circuit as a result. First tests have shown that, despite extreme excitation of the star-point reactor with the third harmonic of the fundamental of the AC voltage, the system remains stable. Circulating currents are largely avoided. Furthermore, in contrast to potential coupling on the DC-voltage side, markedly reduced energy losses occur. The star-point reactor, which in terms of design is similar to an inductive voltage transformer, is available on the market as a standard product, with the result that the apparatus according to the invention is inexpensive.

The invention claimed is:

1. An apparatus for converting an electrical variable in an energy transmission and distribution system, the apparatus comprising:
    a converter to be switched between an AC voltage system and a DC voltage circuit, converter having power semiconductor valves extending between an AC voltage connection and a DC voltage connection, each of said semiconductor valves including a series circuit with bipolar submodules each having an energy storage device and a power semiconductor circuit; and
    a system connection unit connected to said AC voltage connection and configured for connection to the AC voltage system;
    a star-point reactor connected to a potential point between said system connection unit and said converter, said star-point reactor having inductor coils interconnected to form a grounded star point, said inductor coils being configured to represent a current path with a high impedance to ground potential, for alternating current with a fundamental frequency of the AC voltage system, and a current path for a direct current with a low impedance to ground potential.

2. The apparatus according to claim 1, wherein each said inductor coil is connected, with a side thereof remote from said star point, to an associated AC voltage connection of said converter.

3. The apparatus according to claim 1, which comprises a nonreactive resistor connecting said star point of said star-point reactor to ground potential.

4. The apparatus according to claim 1, wherein each inductor coil has a magnetizable core.

5. The apparatus according to claim 4, wherein said core is disposed to delimit an air gap.

6. The apparatus according to claim 1, wherein each submodule has a full-bridge circuit with four disconnectable power semiconductors, which are interconnected with said energy storage device in such a way that an energy storage voltage drop across said energy storage device, a zero voltage, or else an inverse voltage of the energy storage voltage can be generated at output terminals of said submodule.

7. The apparatus according to claim 1, wherein each said submodule comprises a half-bridge circuit with two disconnectable power semiconductors, interconnected with said energy storage device in such a way that an energy storage voltage drop across said energy storage device or a zero voltage can be generated at output terminals of said submodule.

8. The apparatus according to claim 1, wherein said system connection unit is a transformer.

9. The apparatus according to claim 1, wherein said system connection unit comprises an inductance to be connected in series with the AC voltage system.

10. The apparatus according to claim 1, wherein said inductor coils of said star-point reactor are mounted on insulators.

11. The apparatus according to claim 1, wherein said converter has a non-grounded converter star point, and said inductor coils are disposed at said converter star point.

* * * * *